(12) United States Patent
Ireland et al.

(10) Patent No.: US 7,591,178 B2
(45) Date of Patent: Sep. 22, 2009

(54) GROUNDED WIPER ASSEMBLY FOR FUEL SENSOR

(75) Inventors: Hugh W. Ireland, Clio, MI (US); Wayne F. Harris, Grand Blanc, MI (US); Ulf Sawert, Grand Blanc, MI (US); Sharon E. Beyer, Grand Blanc, MI (US)

(73) Assignee: Delphi Technologies, Inc., Troy, MI (US)

( * ) Notice: Subject to any disclaimer, the term of this patent is extended or adjusted under 35 U.S.C. 154(b) by 1562 days.

(21) Appl. No.: 10/426,308

(22) Filed: Apr. 30, 2003

(65) Prior Publication Data

US 2004/0007062 A1    Jan. 15, 2004

Related U.S. Application Data

(60) Provisional application No. 60/386,294, filed on Jun. 5, 2002.

(51) Int. Cl.
*G01F 23/00* (2006.01)

(52) U.S. Cl. .......................................... 73/313
(58) Field of Classification Search ................ 73/313, 73/317, 305, 290 R, 306, 308, 309
See application file for complete search history.

(56) References Cited

U.S. PATENT DOCUMENTS

| 4,318,075 | A | 3/1982 | Pudelko et al. |
| 5,642,718 | A | 7/1997 | Nakai et al. |
| 5,746,088 | A | 5/1998 | Sawert et al. |
| 5,785,032 | A | 7/1998 | Yamashita et al. |
| 6,021,668 | A | 2/2000 | Sawert et al. |
| 6,047,685 | A | 4/2000 | Schelhas et al. |
| 6,168,713 | B1 | 1/2001 | Sekine et al. |
| 6,206,035 | B1 | 3/2001 | Wehner et al. |
| 6,216,671 | B1 | 4/2001 | Sawert et al. |
| 6,500,574 | B2 | 12/2002 | Keegan ..................... 429/23 |
| 6,564,631 | B1 | 5/2003 | Lake et al. ................. 73/313 |
| 2002/0124833 | A1 | 9/2002 | Fauser et al. |
| 2004/0011129 | A1* | 1/2004 | Gilmour et al. ............ 73/313 |

FOREIGN PATENT DOCUMENTS

WO    WO 00/60231    10/2000

OTHER PUBLICATIONS

Gilmour et al., U.S. Appl. No. 60/385,185, filed May 31, 2002, whole document.*

* cited by examiner

*Primary Examiner*—Hezron Williams
*Assistant Examiner*—Rodney T Frank
(74) *Attorney, Agent, or Firm*—Paul L. Marshall

(57) ABSTRACT

A grounded wiper assembly for a fuel sensor includes a wiper housing for rotation relative to a variable resistor and a wiper with at least one contact operatively supported by the wiper housing for contacting the variable resistor as the wiper housing rotates. The grounded wiper assembly includes a float arm connected to the wiper housing and a float connected to the float arm such that the float moves the float arm and the wiper housing relative to the variable resistor as a level of fuel increases and decreases in the fuel tank. The grounded wiper assembly further includes a conductor interconnecting the float arm and the wiper to bleed off electrical charges attached to fuel to ground.

21 Claims, 4 Drawing Sheets

US 7,591,178 B2

GROUNDED WIPER ASSEMBLY FOR FUEL SENSOR

CROSS-REFERENCE TO RELATED APPLICATION(S)

The present invention claims the priority date of copending U.S. Provisional Patent Application Ser. No. 60/386,294, filed Jun. 5, 2002.

TECHNICAL FIELD

The present invention relates generally to fuel sensors for vehicles and, more particularly, to a grounded wiper assembly for a fuel sensor of a vehicle.

BACKGROUND OF THE INVENTION

It is known to provide a fuel sensor in a fuel tank of a vehicle to sense or indicate a level of fuel in the fuel tank. Examples of such fuel sensors are disclosed in U.S. Pat. No. 5,746,088 and U.S. Pat. No. 6,021,668. Typically, the fuel sensor includes a ceramic resistor card operatively connected to structure for a fuel module and a wiper assembly pivotally connected to the structure for engaging the resistor card. The wiper assembly has one end connected to a float arm and float to rotate the wiper assembly relative to the resistor card based on a level of fuel in the fuel tank. However, the mounting of the float arm does not provide a path to dissipate an electrostatic charge from the fuel.

Therefore, it is desirable to provide a grounded path for a wiper assembly. It is also desirable to provide a grounded path for a fuel level sensor circuit. It is further desirable to provide a grounded float arm for a wiper assembly of a fuel sensor.

SUMMARY OF THE INVENTION

It is, therefore, one object of the present invention to provide a grounded wiper assembly for a fuel sensor in a fuel tank.

It is another object of the present invention to provide a grounded float arm for a wiper assembly of a fuel sensor.

To achieve the foregoing objects, the present invention is a grounded wiper assembly for a fuel sensor including wiper housing for rotation relative to a variable resistor and a wiper with at least one contact operatively supported by the wiper housing for contacting the variable resistor as the wiper housing rotates. The grounded wiper assembly also includes a float arm connected to the wiper housing and a float connected to the float arm such that the float moves the float arm and the wiper housing relative to the variable resistor as a level of fuel increases and decreases in the fuel tank. The grounded wiper assembly further includes a conductor interconnecting the float arm and the wiper to bleed off electrical charges attached to fuel to ground.

One advantage of the present invention is that a grounded wiper assembly is provided for a fuel sensor in a fuel tank of a vehicle. Another advantage of the present invention is that the grounded wiper assembly has a float arm mount that also incorporates the contacts for the fuel level sensor. Yet another advantage of the present invention is that the grounded wiper assembly provides a grounded path from the float arm to the electrical circuit of the fuel sensor, thus allowing any electrostatic charge attached to the fuel to dissipate.

Other objects, features, and advantages of the present invention will be readily appreciated, as the same becomes better understood, after reading the subsequent description taken in conjunction with the accompanying drawings.

DESCRIPTION OF THE PREFERRED EMBODIMENT

Figure 1:
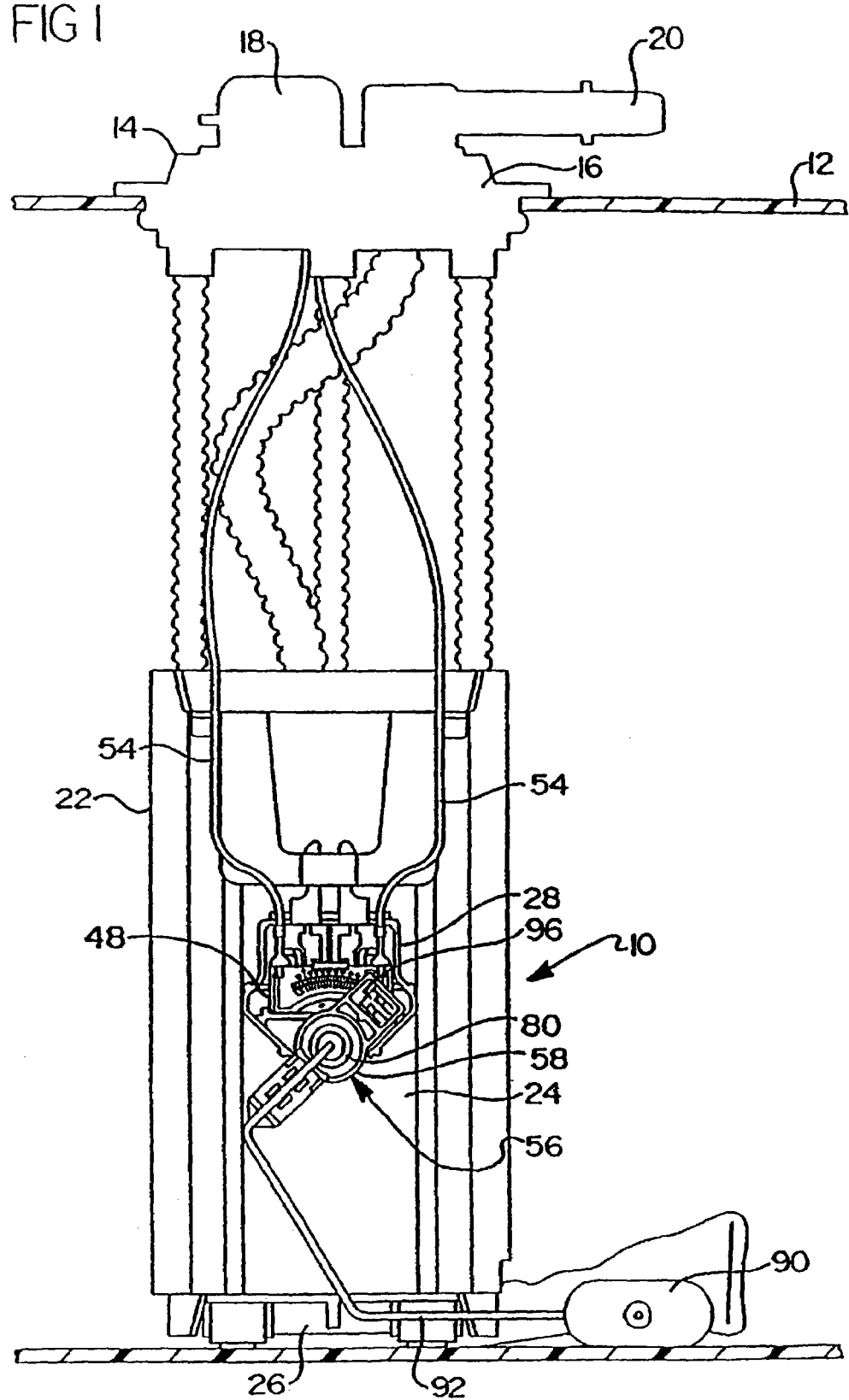
FIG. 1 is a fragmentary elevational view of a fuel sensor, according to the present invention, illustrated in operational relationship with a fuel tank for a vehicle.

Referring to the drawings and in particular FIGS. 1 through 4, one embodiment of a fuel sensor 10, according to the present invention, is shown for a fuel tank 12 (partially shown) of a vehicle (not shown). The fuel tank 12 includes a fuel pump module 14 therein with a removable cover 16 sealed to the top of the fuel tank 12 with an electrical connector 18 and a fuel line outlet connector 20. The fuel tank 12 also includes a fuel reservoir 22 that contains an electrical fuel pump 24 with an inlet 26 and the fuel sensor 10 to indicate fuel level in the fuel tank 12. It should be appreciated that, except for the fuel sensor 10, the fuel tank 12 is conventional and known in the art.

Referring to FIGS. 1 through 4, the fuel sensor 10 includes a sensor housing 28 for connection to the fuel reservoir 22. The sensor housing 28 has a base wall 30 and a side wall 32 generally perpendicular to the base wall 30 to form a chamber 34. The sensor housing 28 also has a pair of arms 36 spaced laterally and extending longitudinally from the side wall 32. The arms 36 have a flange 38 extending laterally from a free end thereof. The arms 36 extend through apertures (not shown) in the fuel reservoir 22 and the flanges 38 prevent removal of the arms 36 from the apertures to suspend the sensor housing 28 from the fuel reservoir 22. It should be appreciated that the arms 36 and flanges 38 provide a snap-in feature for the sensor housing 28.

The sensor housing 28 also includes a support wall 40 extending laterally across the chamber 34 and generally perpendicular to the base wall 30 to support a variable resistor 48 to be described. The sensor housing 28 includes a cavity wall 42 extending generally perpendicular to the base wall 30 and connected to the side wall 32 to form a cavity 44. The cavity wall 42 is generally arcuate in shape to form a generally circular shape for the cavity 44. The sensor housing 28 also has an aperture 46 extending through the cavity 44. The sensor housing 28 is made of a plastic material and formed as a monolithic structure being integral, unitary and one-piece. It should be appreciated that the sensor housing 28 is conventional and known in the art.

Figure 2:
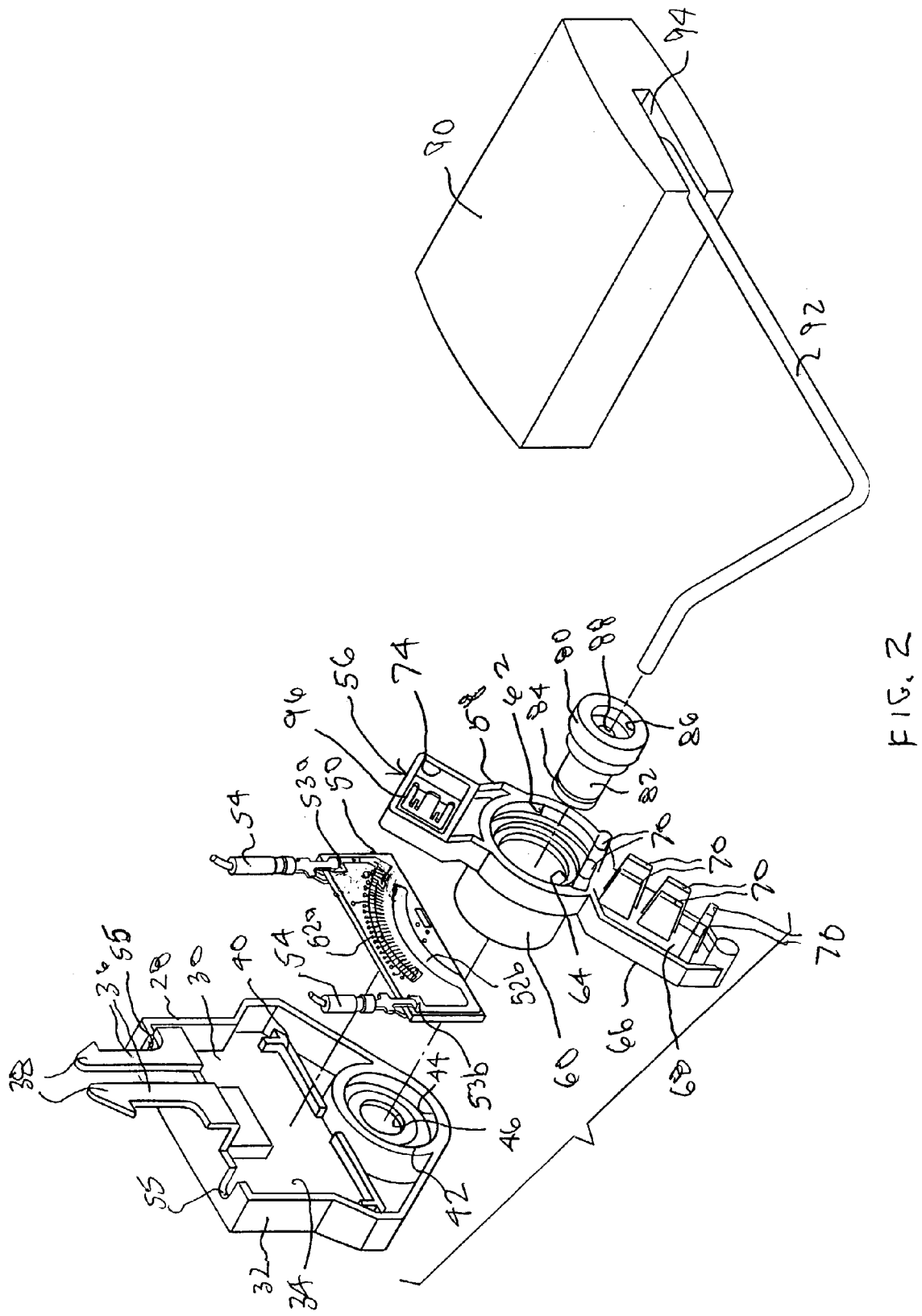
FIG. 2 is an exploded perspective view of the fuel sensor of FIG. 1.
Figure 3:
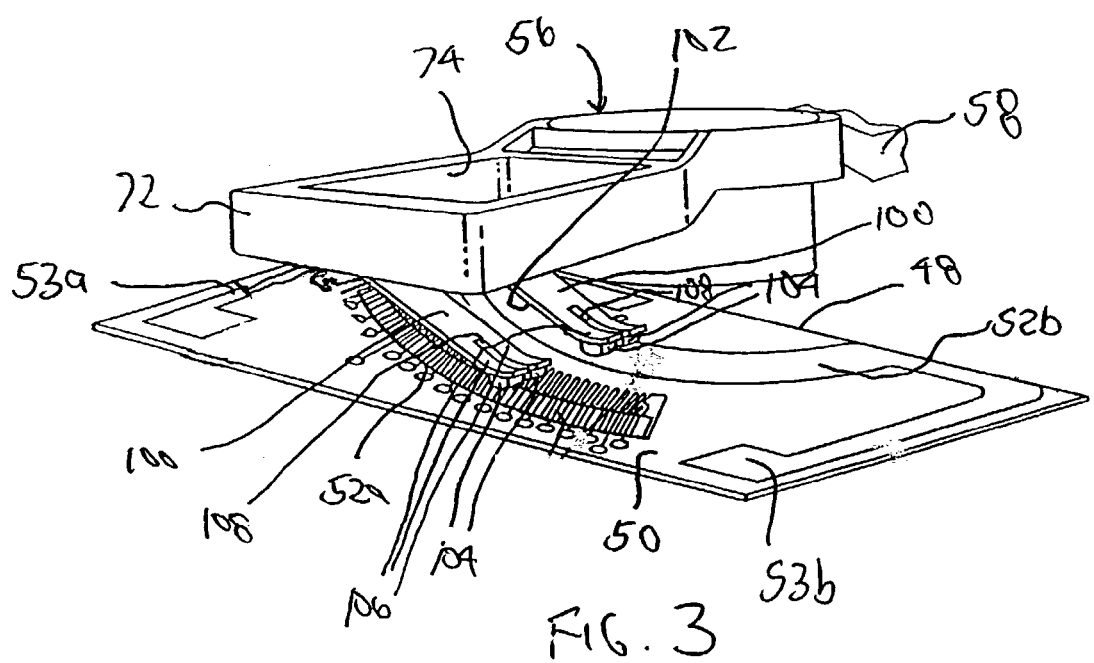
FIG. 3 is a perspective view of a grounded wiper assembly, according to the present invention, of the fuel sensor of FIG. 1.
Figure 4:
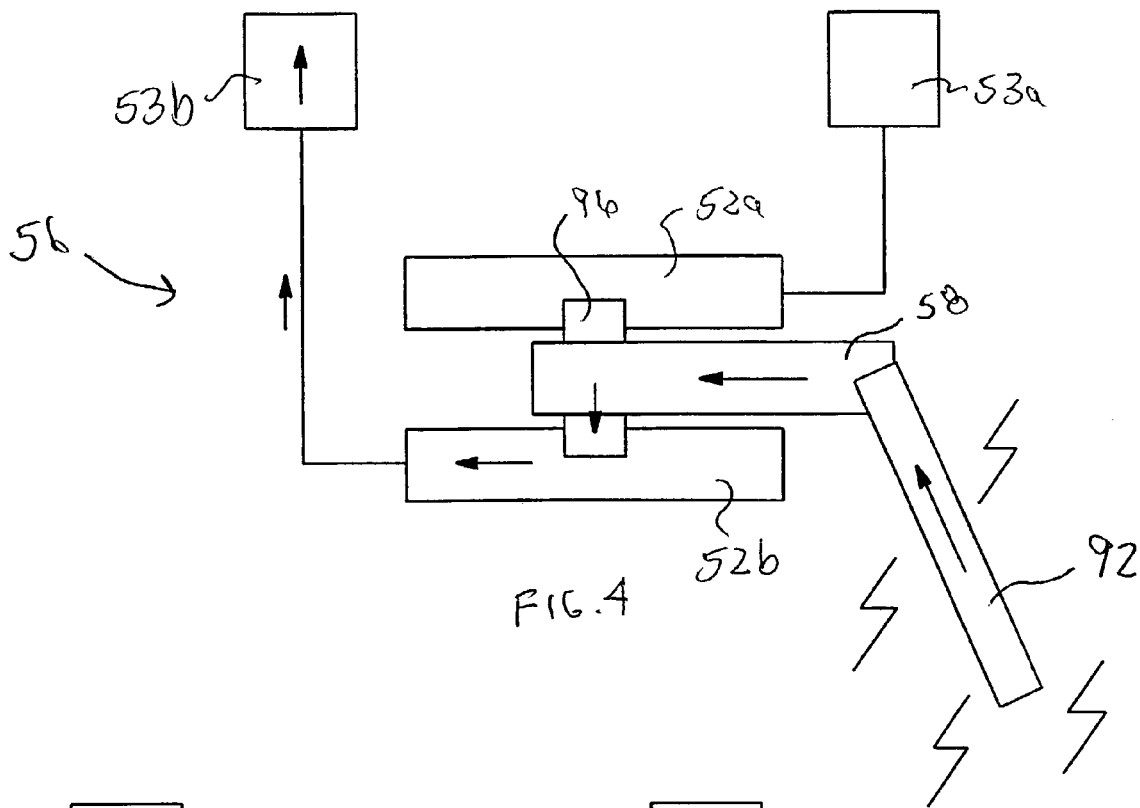
FIG. 4 is a diagrammatic view of the grounded wiper assembly of the fuel sensor of FIG. 1.

Referring to FIGS. 2 through 4, the fuel sensor 10 also includes a variable resistor comprising a ceramic resistor card assembly 48 operatively connected to the sensor housing 28. The ceramic resistor card assembly 48 has a card portion 50 with a resistive bus portion 52a and a conductive bus portion 52b spaced from the resistive bus portion 52a. The card portion 50 also has a solder pad 53a at one end of the resistive bus portion 52a and a solder pad 53b at one end of the conductive bus portion 52b. The resistive bus portion 52a extends over a predetermined angle, for example approximately sixty-five degrees (65°), to provide a variable resistance corresponding to the fuel level in the fuel tank 12. It should be appreciated that the conductive bus portion 52b is a common ground. It should also be appreciated that the solder pads 53a and 53b provide connection points for the B+ and ground terminations of the wires 54 to be described.

The card portion 50 is generally planar and rectangular in shape and made of a ceramic material. The portions 52a and 52b and solder pads 53a and 53b are made of a conductive ink where contacts to be described ride on the card portion 50 are formed in generally arcuate pathways. The conductive ink is made of an alloy of silver (Ag) and palladium (Pd). The conductive ink is of a type known as "GSD" style ink. The conductive ink has an approximate ratio of 2.1:1 Silver (Ag) to Palladium (Pd). The conductive ink may be of a Noble metal type with a composition of gold (Au), palladium (Pd), platinum (Pt), silicon (Si), and bismuth (Bi), which is a Heraeus designated LPA801-040 Pt/Pd/Au Increased Hardness Ink. It should be appreciated that the conductive ink is known in the art.

The ceramic resistor card assembly 48 is disposed in the chamber 34 of the sensor housing 28 and abuts the support wall 40. The ceramic resistor card assembly 48 is connected by suitable means such as wires 54 to the portions 52a and 52b and the electrical connector 18. The wires 54 are press-fit into recesses 55 in the side wall 32 of the sensor housing 28 to support the ceramic resistor card assembly 48 in the chamber 34. It should be appreciated that the electrical connector 18 is connected to a vehicle ground (not shown).

Referring to FIGS. 1 through 4, the fuel sensor 10 further includes a grounded wiper assembly, generally indicated at 56 and according to the present invention, to cooperate with the ceramic resistor card assembly 48 to provide a signal as to a level of fuel in the fuel tank 12. The grounded wiper assembly 56 includes a wiper housing 58 movable relative to the sensor housing 28. The wiper housing 58 has a base portion 60 with a generally cylindrical shape and a generally circular cross-section. The base portion 60 extends axially and has a cavity 62 in one end thereof. The base portion 60 also includes an aperture 64 extending axially therethrough and communicating with the cavity 62. The base portion 60 is disposed in the cavity 44 of the sensor housing 28 for rotation therein.

The wiper housing 58 also 42 includes a float arm portion 66 extending radially from the base portion 60. The float arm portion 66 has a base wall 68 and at least one, preferably a plurality of pairs of laterally spaced tabs 70 extending generally perpendicular to the base wall 68 for a function to be described.

The wiper housing 58 further includes a wiper portion 72 extending radially from the base portion 60 opposite the float arm portion 66. The wiper portion 72 is generally rectangular in shape and has a cavity 74 therein. The wiper portion 72 includes an aperture (not shown) extending therethrough to allow communication with the cavity 74 and form a seat (not shown) for a function to be described. The wiper housing 58 is formed from a conductive polymer such as Acetal (POM) filled with carbon. The conductive polymer has a bulk resistivity of $<=10^6$ Ohms. It should be appreciated that, since build up of electrical potential is a high voltage, low current condition, a dissipative material with a bulk resistance of up to $10^{10}$ Ohms can be used. It should also be appreciated that the wiper housing 58 is formed as a monolithic structure being integral, unitary, and one-piece.

The grounded wiper assembly 56 also includes a bushing 80 disposed in the cavity 62 of the base portion 60. The bushing 80 is generally cylindrical in shape and has a shaft 82 extending axially through the aperture 64 in the base portion 60. The shaft 82 has a diameter less than a diameter of a remainder of the bushing 80 and extends through the aperture 46 of the cavity 44 of the sensor housing 28. The shaft 82 has a groove 84 extending circumferentially about one end to receive a retainer (not shown) to prevent the shaft 82 from exiting the aperture 46 of the sensor housing 28. The bushing 80 has a cavity 86 in the end opposite the shaft 82 and an aperture 88 extending through the cavity 86 and shaft 82 for a function to be described. The bushing 80 is made of a conductive material, preferably a conductive polymer such as Acetal (POM) filled with carbon, or a conductive metal such as brass or stainless steel. The carbon may be in either a powder or fiber form. Further, carbon nano tubes or stainless steel powder can be used to make material conductive. The conductive polymer has a bulk resistivity of $<=10^6$ Ohms. The bushing 80 is formed as a monolithic structure being integral, unitary, and one-piece.

The grounded wiper assembly 56 includes a float 90 and a float arm 92 connected to the wiper housing 58. The float 90 is generally rectangular in shape and has a cavity 94 in one end. The float 90 is made of a floatable material having a density less than a density of the fuel. The float arm 92 is made of a metal material, preferably a plated cold rolled steel. The float arm 92 is a rod that is bent with one end disposed in the cavity 94 of the float 90 and another end disposed in the aperture 88 of the bushing 80. The float arm 92 is also disposed between the tabs 70 of the float arm portion 66 of the wiper housing 58 and retained therein. It should be appreciated that the float arm 92 may be attached to the wiper housing 58 by suitable means such as snaps or other mechanical attachments such as heat, sonic, or mechanical staking.

Referring to FIGS. 2 through 4, the grounded wiper assembly 56 includes a wiper 96 for cooperating with the ceramic resistor card assembly 48. The wiper 96 has a base 98 that is generally rectangular in shape. The wiper 96 also has at least one, preferably a plurality of contact flex arms 100 formed by slots 102 spaced laterally and extending longitudinally in the base 98. The contact flex arms 100 extend longitudinally and downward at an angle from the base 98. The contact flex arms 100 and base 98 are formed from a non-Noble metal such as copper. The contact flex arms 100 and base 98 are integral, unitary and formed as one-piece. The base 98 is disposed in the cavity 74 of the wiper portion 72 of the wiper housing 58 adjacent the seat such that the contact flex arms 100 extend through the aperture toward the ceramic resistor card assembly 48. The wiper 96 is preferably insert molded into the wiper portion 72 of the wiper housing 58 to retain the wiper 96 thereto. It should also be appreciated that the wiper 96 is operatively supported by the wiper housing 58. It should further be appreciated that the wiper 96 is mechanically attached to the wiper portion 72 of the wiper housing 58 by either insert molding, heat staking, or mechanical staking. It should still further be appreciated that the contact flex arms 100 flex or deflect relative to the base 98.

The wiper 96 also includes at least one, preferably a plurality of or multiple contacts 104 near a free end of each contact flex arm 100. As illustrated in FIG. 3, each contact flex arm 100 has a plurality of contact portions 106 extending longitudinally by slots 108 spaced laterally and extending longitudinally in the free end thereof. The contacts 104 have a generally barrel shape formed by a wire extending laterally and secured to the contact flex arm 100 by suitable means such as welding. The barrel shape of the contacts 104 provides an arcuate surface to contact the conductive ink of the ceramic resistor card assembly 48. The contacts 104 are made of a Noble metal such as Neyoro-D having a composition of 10% Pd, 1% Ag, 14% Cu, 10% Pt, 1% Zn, and 64% Au by weight. It should be appreciated that the contacts 104 are known in the art.

In operation, the fuel sensor 10 is operatively connected to the fuel reservoir 22 of the fuel pump module 14 inside the fuel tank 12. Fuel inside the fuel tank 12 causes the float 90 to rise to the top thereof. The wiper 96 engages the portions 52a and 52b of the ceramic resistor card assembly 48. The contacts 104 engage the portions 52a and 52b and the contact flex arms 100 create a shorting bar between resistive and conductive paths on the ceramic resistor card assembly 48 to provide a predetermined resistance when an electrical signal is sent by a controller (not shown) via the electrical connector 18 to indicate the level of fuel in the fuel tank 12. As the fuel level increases or decreases in the fuel tank 12, the float 90 is raised or lowered to rotate the wiper housing 56 relative to the sensor housing 28 via the float arm 92. As the wiper housing 56 rotates, the wiper 96 rotates across the portions 52a and 52b and the contacts 104 move to different portions thereof to vary or provide a different predetermined resistance to indicate the level of fuel in the fuel tank 12. It should be appreciated that the wiper 96 has the ability to function in a five-volt (5 v), ten milliamp (10 mA) system. It should also be appreciated that the multiple contacts 104 insure that there is no break between the conductive and resistive bus portions 52a and 52b.

As illustrated in FIG. 4, the arrows show the bleed off of electrical potential to the vehicle ground. The electrical charges attached to the fuel are transferred to the float arm 92, and are bled off through an electrical circuit established by the float arm 92, wiper housing 58, wiper 96, contacts 104, the conductive portion 52b, and solder pad 53b. This electrical circuit is then attached to the vehicle ground through the wires 54 and the electrical connector 18. It should be appreciated that the wiper housing 58 acts as a conductor to bleed off electrical charges attached to the fuel.

Figure 5:
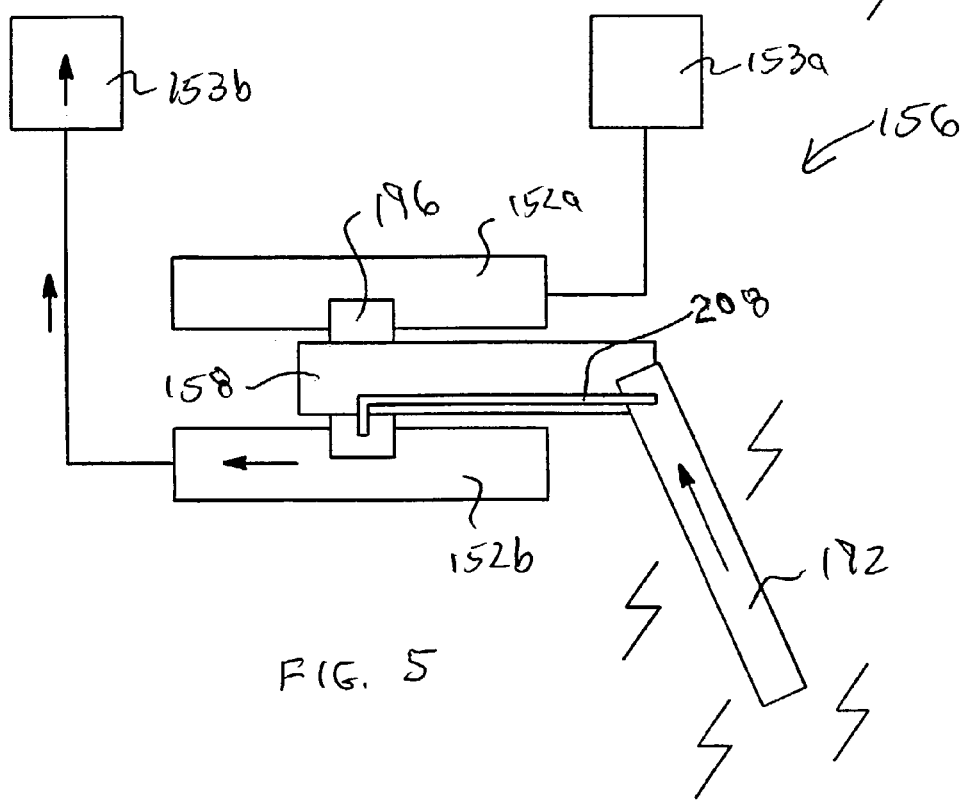
FIG. 5 is a diagrammatic view of another embodiment, according to the present invention, of the grounded wiper assembly of the fuel sensor of FIG. 1.

Referring to FIG. 5, another embodiment, according to the present invention, of the grounded wiper assembly 56 is shown. Like parts of the grounded wiper assembly 56 have like reference numerals increased by one hundred (100). In this embodiment, the grounded wiper assembly 156 includes a conductor 208 extending between the float arm 192 and the wiper 196. The conductor 208 is a metal stamping or wire to make intimate and direct contact between the wiper 196 and the float arm 192. The electrical charges attached to the fuel are transferred to the float arm 192, and are bled off through an electrical circuit established by the float arm 192, conductor 208, wiper 196, the conductive portion 152b, and solder pad 153b. This electrical circuit is then attached to the vehicle ground through the wires 54 and the electrical connector 18. It should also be appreciated that the operation of the wiper assembly 156 is similar to the wiper assembly 56.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

The invention claimed is:

1. A grounded wiper assembly for a fuel sensor comprising:
a wiper housing for rotation relative to a variable resistor and a wiper with at least one contact operatively supported by said wiper housing for contacting the variable resistor as said wiper housing rotates;
a float arm connected to said wiper housing and a float connected to said float arm such that said float moves said float arm and said wiper housing relative to the variable resistor as a level of fuel increases and decreases in the fuel tank; and
a conductor interconnecting said float arm and said wiper to bleed off electrical charges attached to fuel to ground.

2. A grounded wiper assembly as set forth in claim 1 wherein said conductor comprises said wiper housing being made of a conductive material.

3. A grounded wiper assembly as set forth in claim 1 wherein said conductor comprises a metal member.

4. A grounded wiper assembly as set forth in claim 3 wherein said metal member comprises a wire.

5. A grounded wiper assembly as set forth in claim 3 wherein said metal member comprises a stamping.

6. A grounded wiper assembly as set forth in claim 2 wherein said conductive material comprises either one of a conductive polymer and conductive metal.

7. A grounded wiper assembly as set forth in claim 6 wherein said conductive polymer has a bulk resistivity of less than or equal to $10^6$ Ohms.

8. A grounded wiper assembly as set forth in claim 6 wherein said conductive polymer has a bulk resistivity of up to $10^{10}$ Ohms.

9. A grounded wiper assembly as set forth in claim 1 including wires for connection to the variable resistor and the ground.

10. A fuel sensor comprising:
a variable resistor;
a grounded wiper assembly for rotation relative to said variable resistor;
said grounded wiper assembly having a wiper housing, a wiper with at least one contact operatively supported by said wiper housing for contacting said variable resistor as said grounded wiper assembly rotates, a float arm connected to said wiper housing, a float connected to said float arm such that said float moves said float arm and said wiper housing relative to said variable resistor as a level of fuel increases and decreases in the fuel tank, and a conductor interconnecting said float arm and said wiper to bleed off electrical charges attached to fuel through said grounded wiper assembly to ground.

11. A fuel sensor as set forth in claim 10 wherein said conductor comprises said wiper housing being made of a conductive material.

12. A fuel sensor as set forth in claim 10 wherein said conductor comprises a metal member.

13. A fuel sensor as set forth in claim 12 wherein said metal member comprises a wire.

14. A fuel sensor as set forth in claim 12 wherein said metal member comprises a stamping.

15. A fuel sensor as set forth in claim 11 wherein said conductive material comprises either one of a conductive polymer and conductive metal.

16. A fuel sensor as set forth in claim 15 wherein said conductive polymer has a bulk resistivity of less than or equal to $10^6$ Ohms.

17. A fuel sensor as set forth in claim 15 wherein said conductive polymer has a bulk resistivity of up to $10^{10}$ Ohms.

18. A fuel sensor as set forth in claim 10 wherein said variable resistor includes a resistive portion, a conductive portion, a first solder pad connected to said resistive portion, and a second solder pad connected to said conductive portion.

19. A fuel sensor as set forth in claim 18 including wires for connection to said first solder pad and said second solder pad and the ground.

20. A fuel sensor comprising:
a variable resistor;
a grounded wiper assembly for rotation relative to said variable resistor;
said grounded wiper assembly having a wiper housing, a wiper with at least one contact operatively supported by said wiper housing for contacting said variable resistor as said grounded wiper assembly rotates, a float arm connected to said wiper housing, a float connected to said float arm such that said float moves said float arm and said wiper housing relative to said variable resistor as a level of fuel increases and decreases in the fuel tank, and said wiper housing being made of a conductive polymer interconnecting said float arm and said wiper to bleed off electrical charges attached to fuel through said grounded wiper assembly to ground.

21. A fuel sensor comprising:
a variable resistor;
a grounded wiper assembly for rotation relative to said variable resistor;
said grounded wiper assembly having a wiper housing, a wiper with at least one contact operatively supported by said wiper housing for contacting said variable resistor as said grounded wiper assembly rotates, a float arm connected to said wiper housing, a float connected to said float arm such that said float moves said float arm and said wiper housing relative to said variable resistor as a level of fuel increases and decreases in the fuel tank, and a metal member interconnecting said float arm and said wiper to bleed off electrical charges attached to fuel through said grounded wiper assembly to ground.

* * * * *